Jan. 23, 1968   M. J. FETNER ET AL   3,364,745
APPARATUS AND METHOD OF MEASURING MOLTEN METAL TEMPERATURE
Filed Feb. 16, 1966
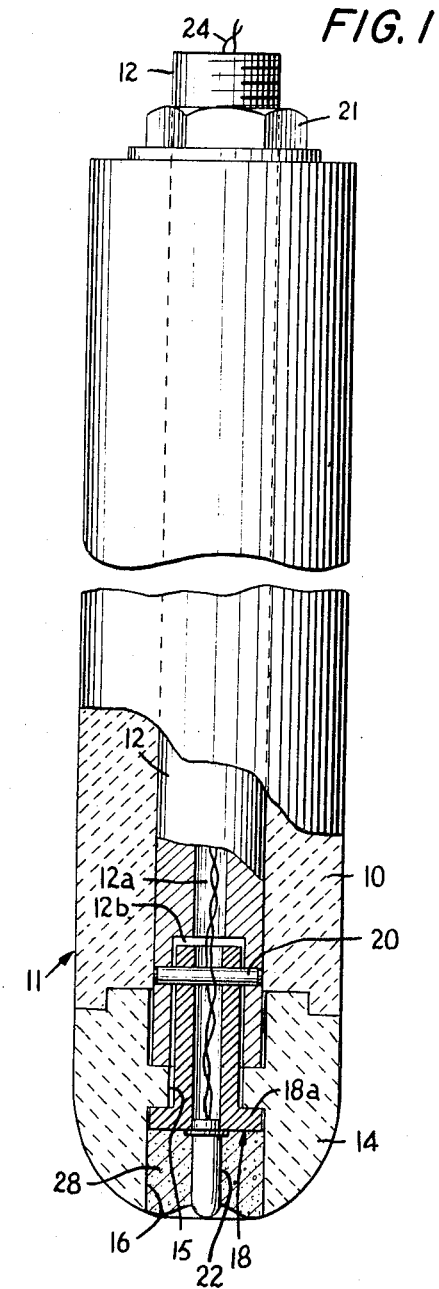
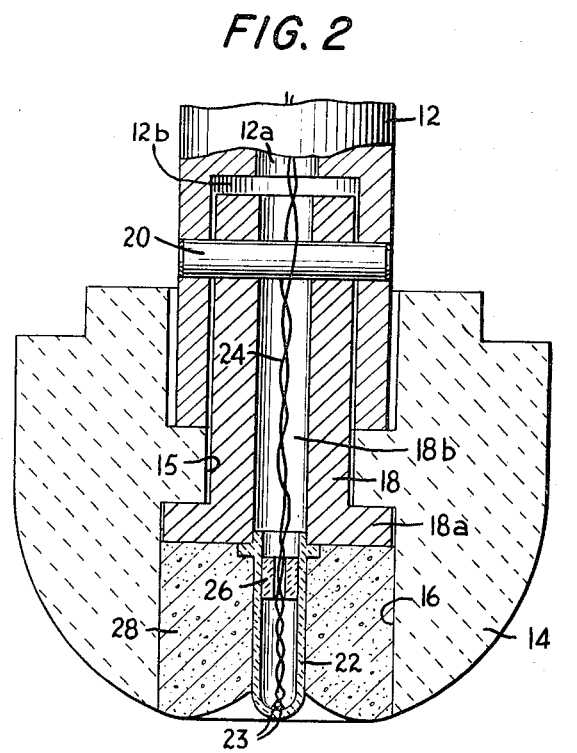
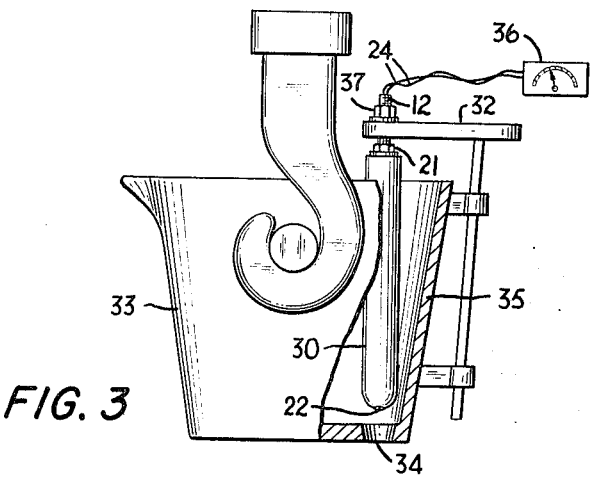
INVENTORS
MARTIN J. FETNER &
ROBERT P. FREEDMAN
BY
Brumbaugh, Free, Graves & Donohue
their ATTORNEYS United States Patent Office 3,364,745
Patented Jan. 23, 1968

3,364,745
APPARATUS AND METHOD OF MEASURING MOLTEN METAL TEMPERATURE
Martin J. Fetner, New London, and Robert P. Freedman, Ledyard, Conn., assignors to General Dynamics Corporation, New York, N.Y., a corporation of Delaware
Filed Feb. 16, 1966, Ser. No. 527,968
10 Claims. (Cl. 73—359)

ABSTRACT OF THE DISCLOSURE

Apparatus for continuously measuring the temperature of molten metals in melt vessels, including a stopper assembly of the type having a refractory sheath adapted for insertion in the vessel from above molten metal levels in the vessel. The sheath slidably supports a hollow rod extending from one end of the sheath to the other. At the immersable end of the sheath are an end cap abutting the end of the sheath and having a counter-bored passage communicating with the hollow portion of the rod, and a flanged retaining plug in the counterbored passage coupled to the rod and supporting a refractory tube for exposure of an end of the tube to the molten metal. The refractory tube encloses a temperature responsive element from which electrical conductors travel through a passage in the plug and though the hollow portion of the rod, the upper end of which is threaded to receive a nut for applying tension to the rod and thus to maintain the cap, plug and sheath in sealed relation. The portion of the counterbored passage in the end cap surrounds the refractory tube and is filled with refractory cement that is slightly recessed adjacent the tube end.

---

This invention relates to an improved apparatus and method for continuously measuring the high temperature of molten metals.

The metallurgical industry has been faced for some time with the problem of obtaining direct indications of the temperature of molten metals. A number of methods used by the industry have proved satisfactory in limited applications. Pyrometry and infra-red measurements, for example, are sometimes satisfactory, but the application of these techniques is by no means universal, and their usefulness is restricted to the measurement of temperatures at only certain stages of metal production.

A popular procedure for measuring the temperature of molten metals in ladles or tundishes has been to immerse an expendable thermocouple in the molten bath to obtain an instantaneous electrical signal of the temperature. This measurment is necessarily brief, since the high temperature of the metal destroys the thermocouple moments after immersion; therefore, several such thermocouples must be used if a reasonably accurate plot of the temperature over a period of time is desired. In the special case of measuring molten metal temperatures in oxygen converters, the hood of the converter must be lifted to insert the thermocouple, necessitating an interruption in in the "blow."

More recently, a number of special temperature sensing probes have been suggested for use in melt vessels. To some extent, the development of superior refractory materials protecting the thermocouple junction and adapted for immersion in the molten metal has made these probes nominally successful. Notwithstanding this, however, these materials are still subject to deterioration from erosion and the effects of intense heat from the molten bath. Thus, although continuous measurement of high temperatres is possible for limited periods of time, the parts of all known temperature measuring apparatus of this type which are exposed to these effects must be frequently replaced.

Most of the apparatus or probes referred to above are inserted through the side walls and lining of the melt vessel. Their common serious drawback is, therefore, that they can be replaced only when the vessel is empty or out of operation. If they fail during operation, continuous monitoring of temperature is precluded for the remainder of the run. In addition to the foregoing disadvantages, most known apparatus require that the melt vessel be substantially modified in various ways, as by providing special apartures in the walls and lining of the vessel through which a probe may be inserted.

It is therefore an object of this invention to provide an improved apparatus for continuously measuring the temperature of molten metals which overcomes the disadvantages of known temperatures measuring devices.

Another object of this invention is to provide a temperature measurement probe which is simple and reliable in construction and which may be used without modification of the melt vessel.

Still another object of the invention is to provide a method and apparatus for measuring the temperature of molten metal at lower levels in the vessel.

Further objects of this invention are to provide a method and apparatus employing a conventional vessel stopper assembly for making molten metal temperature measurements.

In brief, these and other objects of the invention are attained by incorporating a thermoelectric device into the stopper assembly of a ladle or other vessel. Specifically, a refractory tube containing the thermoelectric device is disposed adjacent a plug closing the end of the stopper assembly for exposure of a sealed end of the tube to the molten metal. Electrical connections to the device, which may be a conventional thermocouple, are made to conductors extending through a stopper rod and the plug. In a preferred embodiment, the plug is mechanically coupled to the rod, which may be removed from a stopper sleeve surrounding the rod, and the tube and plug are cemented to the end of the stopper assembly. With this construction the temperature probe is an integral part of the stopper assembly, thereby eliminating the need for additional special temperature sensing units. Temperature measurements are then made by supporting the assembly in the vessel with the refractory tube exposed to the metal and recording electrical indications from the thermoelectric device.

For a better understanding of the invention, reference may be made to the following detailed description of exemplary embodiments thereof, and to the drawings, in which:

FIGURE 1 is a side elevation of a temperature probe assembly in accordance with the invention, partially cut away in cross-section;

FIGURE 2 is an enlarged cross-section of the end of the probe shown in FIGURE 1; and FIGURE 3 is a schematic representation of a ladle, partially cut away to show a representative position of the assembly in a melt vessel.

Referring now to FIGURE 1, an apparatus in accordance with the invention includes a stopper assembly having a refractory sheath 11 made up in part by a sleeve 10 slidably supporting the stopper rod 12. Extending the length of the rod 12 is a bore 12a, the purpose of which is to receive electrical conductors, as will be subsequently explained in more detail. At the end of the refractory sleeve 10 and forming the remainder of the sheath 11 is a button, or cap 14, the end of which is rounded or contoured to co-act with the nozzle of a ladle (see FIGURE 3). The cap 14, which is of a refractory material such as firebrick or graphite, contains a bore 15 communicating with a recess 16 which together form a counterbored passage in the cap 14 opening to the expanded portion 12b of the bore 12a in the rod. A keeper, or plug 18, having a radially extending flange 18a is received in the counterbored passage and the expanded portion 12b of the bore in the rod, the flange 18a cooperating with the shoulder formed between the bore 15 and recess 16 to restrict axial movement of the plug 18 once the flange 18a abuts the shoulder. The plug 18 and rod 12 are coupled by a pin 20 extending through these parts, so that the plug 18 and rod 12 move together in the axial direction. When the nut 21 engaging threads at the upper end of the rod 12 is tightened, the rod 12 is drawn upwardly, thus maintaining the cap 14, sleeve 10, and plug 18 in sealing relation, and in mutually overlapping relation axially in the sheath.

Turning to the more detailed drawing of FIGURE 2, a refractory tube 22 sealed at one end is disposed adjacent the plug 18 so that its open end communicates with the bore 18b in the plug. The tube 22 contains in physical proximity to its sealed end a thermocouple 23 formed between the junction of a pair of dissimilar metal conductors 24. A plug 26 of refractory material in the tube 22 receives the conductors 24 for passage therethrough and into the bore 18b of the plug and the bore 12a of the rod so that the conductors may be connected to a recording apparatus (see FIGURE 3) external to the stopper assembly. As briefly discussed earlier, the effects of heat and erosion eventually wear away even highly refractory materials. The plug 26, therefore, provides a safeguard against possible damage should the sealed end of the refractory tube 22 become damaged while in operation and open the end of the stopper to the flow of molten metal. A high temperature-resistant material 28 such as refractory cement surrounds and supports the tube in the recess 16 so that only the sealed end of the tube 22 is exposed to the molten metal. Preferably, the refractory cement 28 extends beyond the tip of the tube 22 near the periphery of the recess 16 to form a protective circular ridge preventing physical damage to the tube.

A conventional stopper assembly can be prepared to enable the stopper assembly to perform a dual role of stopper and temperature sensing probe. In accordance with the invention, this is accomplished by providing passages 12a, 18b in the stopper rod and the keeper or plug 18 of the original assembly. Following, a refractory tube 22 containing a thermocouple or other temperature responsive element is mounted to or adjacent the plug 18 so that the tube communicates with the bore in the plug 18. Conductors 24 leading to the thermocouple are then passed through the respective passages to the top of the stopper. Next, the tube is cemented to the end cap or button and the plug, leaving the sealed end of the tube exposed.

Since the usual practice is to rebuild the stopper and the vessel nozzle at the end of each run, the refractory tube can readily be replaced at that time. It will be appreciated, therefore, that a separate operation of repairing and rebuilding independent or special temperature probes is unnecessary, since the probe has been integrated with the stopper, which in any case must be disassembled and rebuilt between runs, or heats.

FIGURE 3 illustrates a typical stopper 30 on a support 32 attached to a ladle 33. As shown, the exposed end of the refractory sensing tube 22 is directly over the nozzle 34 and is therefore in a position to measure the molten metal temperature at the lower levels of the ladle. It is also apparent that no modification of the ladle 33, such as the insertion of special apparatus in the wall 35, is necessary.

For the purpose of illustration, the conductors 24 from the thermocouple are shown connected to an indicating instrument 36. The support 32 includes a mechanism, represented by the nut 37 engaging the threads of the rod 12, by which the longitudinal (vertical) position of the stopper 30 may be adjusted. When the stopper is moved upwardly, the rate of flow of the molten metal in the vessel through the nozzle 34 increases; downward movement of the stopper 30 reduces the molten metal flow.

The arrangement shown in FIGURE 3 is that which is used for bottom pour casting ladles, the molten metal flow controlled by the stopper 30 to fill casting molds (not shown) at the desired rate. In casting with ladles of this type it is essential to continuously monitor the temperature, and it is particularly desirable to detect the metal temperature in the immediate vicinity of the ladle nozzle to eliminate errors caused by any temperature gradients existing in the molten bath. By providing a temperature-responsive device 23 mounted in the refractory tube 22 at the end of the stopper 30, as illustrated, this can be accomplished.

In practice, a "zero," or reference, reading may be taken prior to placing the stopper in the vessel. Before the ladle is filled, the stopper is placed in the vessel to seal with the end thereof the nozzle 34. When pouring, the stopper 30 is positioned to open the nozzle and to obtain the desired flow rate. When in this position the sensing tube 22 is directly over the nozzle and situated for exposure to the metal flowing past the end of the stopper 30 and through the nozzle 34. The signals obtained from the thermocouple 23 and registered on the instrument 36 provide a direct indication of the temperature of the metal leaving the ladle 33, and, if necessary, may be compensated by the reference reading taken under no flow conditions. It is, of course, understood that the stopper assembly is equally applicable to uses in other installations, such as where the ladle is not of the bottom pour type, the attendant advantages of the invention discussed above still pertaining.

The invention thus provides an improved temperature measuring apparatus which can be prepared from a conventional vessel stopper and employed without modification or costly alteration of the vessel itself. Its universal application to existing equipment and operation renders it especially useful, at the same time avoiding the hazards and complications of known apparatus.

Although the invention has been described with reference to a specific embodiment thereof, it is apparent that certain modifications and variations, both in form and detail, may be made within the skill of the art. All such modifications and variations, therefore, are intended to be included within the scope and spirit of the invention as defined in the appended claims.

We claim:

1. In an apparatus for continuously measuring the temperature of molten metals in melt vessels, the combination of a stopper assembly of the type having a refractory sheath and adapted for insertion in the vessel from above molten metal levels therein, a hollow rod in said sheath extending from near one end of the sheath to the other end thereof outside the vessel, a temperature responsive element, a heat-conductive refractory tube sealed at one end enclosing said temperature responsive element to transmit heat thereto from the metal whose temperature is to be measured, an end cap adjacent the one end of the sheath, plug means extending through the end cap and into said rod, said plug means positioning the tube in said end cap for exposure of the sealed tube end to the molten metal, and means coupling the plug means to the rod, said plug and coupling means cooperating with the rod to maintain the end cap in sealed relation to the sheath.

2. Apparatus as set forth in claim 1, wherein the end cap has a recess surrounding the tube and receiving the plug means, and further comprising a refractory material adjacent said plug means and surrounding the tube in said recess to leave only a portion of the sealed end thereof exposed to the molten metal and to seal the recess against passage of the molten metal therethrough.

3. Apparatus in accordance with claim 2 in which the refractory material adjacent the tube is slightly recessed about the one end of the tube.

4. In an apparatus for continuously measuring the temperature of molten metals in melt vessels and the like, a stopper assembly of the type including a refractory sleeve and adapted for insertion in the vessel from above molten metal levels therein, a hollow rod removably supported in said sleeve and extending approximately the length thereof, a refractory tube sealed at one end and containing a thermoelectric device connected to electrical conductors for developing an electrical signal responsive to the temperature of the molten metal, a refractory cap at an end of the sleeve and having a passage communicating with the hollow portion of said rod, retaining plug means received for restricted axial movement in said passage and supporting said tube for exposure to the molten metal, means for coupling the plug means to the rod, and means at the other end of the sleeve for applying tension to the rod to maintain the cap in sealing relation to said sleeve and said rod.

5. Apparatus in accordance with claim 4, further comprising a refractory plug in said tube receiving the conductors for passage therethrough, said plug sealing the interior of the tube against passage of molten metal therethrough upon rupture of the exposed tube end.

6. Apparatus as defined in claim 4, in which the end cap, rod and retaining plug means are in mutually overlapping relation axially of the sheath.

7. Apparaus for measuring the temperature of molten metals and the like, comprising a stopper assembly of the type including a refractory sleeve adapted for insertion in the vessel from above molten metal levels therein, a hollow rod slidably supported in the sleeve and extending approximately the length thereof, a refractory tube sealed at one end and containing a thermocouple junction between dissimilar material conductors adapted for passage through the hollow rod, a refractory cap abutting an end of the sleeve and adapted to close an orifice in the vessel, said refractory cap having an axial counterbored passage therethrough, plug means received within said counterbored passage and having an axial bore and a radially extending flange, means coupling said plug means to said rod, said coupling means and flange co-operating with the counterbored passage to maintain the cap, sleeve and plug means in sealing relation, said plug means positioning the tube in said end cap for exposure of its sealed end to the molten metal and passage of the conductors through the axial bore therein, and refractory means surrounding and supporting the tube in said counterbored passage.

8. A method of obtaining indications of the temperature of molten metal at the low levels of a melt vessel having an exit nozzle and a stopper assembly adapted to adjustably control the rate of flow of the molten metal through the nozzle, comprising the steps of positioning the end of the assembly adjacent the nozzle with a thermoelectric device for producing electrical signals responsive to the temperature of the metal, adjusting the assembly so as to block with the end thereof the passage of metal through the nozzle, readjusting the assembly to open the nozzle and yield a desired rate of metal flow therethrough, and recording the electrical signals produced by the device in response to the temperature of the metal flowing past the end of the assembly and through the nozzle.

9. Apparatus for continuously measuring the temperature of molten metal in a vessel having an exit orifice comprising, in combination, a stopper assembly of the type having a refractory sheath adapted for immersion at one end thereof into the molten metal in the vessel, refractory tube means including a thermoelectric device for providing electrical signals responsive to the temperature of the molten metal in contact with a sealed end of said tube, refractory means at the one end of said sheath supporting the tube for exposure of the sealed end thereof to the metal and sealing said assembly against the passage of molten metal therethrough, said refractory means and one end of the sheath adapted to co-operate with the orifice of the vessel to control the rate of metal flow therethrough, means connected to said device for transmitting said electrical signals to a point external to the vessel, and means adjustably supporting said assembly for immersion of the one end of said sheath in the molten metal and for adjusting the longitudinal position of said refractory means relative to the vessel exit orifice to control the rate of molten metal flow through the orifice.

10. Apparatus for continuously measuring the temperature of molten metal in a vessel having an exit orifice comprising, in combination, a stopper assembly of the type having a refractory sheath, a hollow rod in said sheath extending from near one end of the sheath to the other end thereof, a refractory tube sealed at one end and containing a temperature responsive element, means extending into and coupled to said rod at the one end of the sheath, said means supporting the tube for exposure of its sealed end to the molten metal, refractory means adjacent said tube supporting means and surrounding said tube to leave only a portion of the sealed end thereof exposed to the molten metal and to seal said assembly against the passage of molten metal therethrough, and means adjustably supporting said assembly for immersion of the one end of said sheath in the molten metal and for adjusting the longitudinal position of said refractory means relative to the vessel exit orifice to control the rate of molten metal flow through the orifice.

References Cited
UNITED STATES PATENTS

| | | | |
|---|---|---|---|
| 3,136,160 | 6/1964 | Randall | 73—359 |
| 3,277,716 | 10/1966 | Cox | 73—359 |
| 3,281,518 | 10/1966 | Stroud et al. | 73—359 |
| 3,288,654 | 11/1966 | Perrin et al. | 73—359 |
| 3,306,783 | 2/1967 | Silver | 73—359 |

DAVID SCHONBERG, *Primary Examiner.*

LOUIS PRINCE, *Examiner.*

NEIL SIEGEL, *Assistant Examiner.*